(12) United States Patent  
Zhao et al.

(10) Patent No.: US 12,457,540 B2  
(45) Date of Patent: Oct. 28, 2025

(54) METHOD AND APPARATUS FOR COMMUNICATIONS USING DIGITAL REFLECTORS BASED ON ROUTING LOCATOR

(71) Applicant: HUAWEI TECHNOLOGIES CO., LTD., Guangdong (CN)

(72) Inventors: Mingyu Zhao, Shanghai (CN); Xueqiang Yan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 18/183,440

(22) Filed: Mar. 14, 2023

(65) Prior Publication Data

US 2023/0224793 A1    Jul. 13, 2023

Related U.S. Application Data

(63) Continuation of application No. PCT/CN2021/097220, filed on May 31, 2021.

(30) Foreign Application Priority Data

Sep. 14, 2020 (CN) .......................... 202010959724.4

(51) Int. Cl.
*H04W 40/02* (2009.01)
*H04L 67/10* (2022.01)
*H04L 67/14* (2022.01)
*H04L 67/52* (2022.01)
*H04L 67/568* (2022.01)
*H04W 8/18* (2009.01)
*H04W 8/20* (2009.01)
*H04W 8/26* (2009.01)

(Continued)

(52) U.S. Cl.
CPC .................................. *H04W 40/02* (2013.01)

(58) Field of Classification Search
CPC ....... H04W 40/02; H04W 8/26; H04W 40/00; H04W 40/20; H04W 8/183; H04W 8/205; H04L 67/10; H04L 67/14; H04L 67/52; H04L 67/568

See application file for complete search history.

(56) References Cited

U.S. PATENT DOCUMENTS

2013/0138822 A1\* 5/2013 Hu .......................... H04L 67/146
709/227
2020/0068452 A1\* 2/2020 Liao ...................... H04W 72/27

(Continued)

*Primary Examiner* — Harry H Kim
(74) *Attorney, Agent, or Firm* — Fish & Richardson P.C.

(57) ABSTRACT

This application provides methods and apparatuses for communication. In an example method, a first digital reflection (DR) receives a first message, where the first message includes data to be sent to a first terminal device and an identifier of the first terminal device, and the first DR is associated with the first terminal device. The first DR transmits the data to the first terminal device based on a local locator (LLOC) of the first terminal device, where the first DR stores a twin-globally unique temporary identity (TWIN-GUTI) of the first terminal device, the TWIN-GUTI includes the LLOC, the LLOC corresponds to the identifier of the first terminal device, the first DR is deployed on first multi-access edge computing (MEC), and the TWIN-GUTI is generated by the first MEC.

20 Claims, 7 Drawing Sheets

(51) Int. Cl.
H04W 40/00 (2009.01)
H04W 40/20 (2009.01)

(56) References Cited

U.S. PATENT DOCUMENTS

| | | | |
|---|---|---|---|
| 2023/0258759 A1* | 8/2023 | Wang | G01S 1/0423 |
| | | | 455/456.1 |
| 2024/0027574 A1* | 1/2024 | Zhuang | G01S 13/87 |
| 2024/0187086 A1* | 6/2024 | Elshafie | H04B 7/15528 |
| 2024/0235623 A1* | 7/2024 | Sahraei | H04B 7/0456 |

* cited by examiner

METHOD AND APPARATUS FOR COMMUNICATIONS USING DIGITAL REFLECTORS BASED ON ROUTING LOCATOR

CROSS-REFERENCE TO RELATED APPLICATIONS

This application is a continuation of International Application No. PCT/CN2021/097220, filed on May 31, 2021, which claims priority to Chinese Patent Application No. 202010959724.4, filed on Sep. 14, 2020. The disclosures of the aforementioned applications are hereby incorporated by reference in their entireties.

TECHNICAL FIELD

This application relates to the communication field, and more specifically, to a communication method and apparatus.

BACKGROUND

All existing communication networks are network-centric, and users adapt to the networks, that is, the users can select only a function provided by the networks. Especially, a function provided by a centralized core network is of a large granularity, and cannot meet personalized requirements of the users. An existing centralized core network element entity can generally process a large quantity of users, and is deployed in a centralized manner. Therefore, the centralized core network element entity has a high position in a network, and has a risk of a single point failure, for example, network elements such as a mobility management network element, a session management network element, a user data management network element, and a policy management network element.

Currently, a user centric network (UCN) architecture is proposed. A digital reflection (DR) is deployed on an edge cloud. Each UE has its own DR. The DR can be dynamically migrated to multi-access edge computing (MEC) where a user is located along with the user as required, to implement a user centric network architecture design.

The UCN network architecture is a disruptive design for an existing network architecture. Therefore, many existing network functions, communication solutions, workflows, and the like need to be changed accordingly. Communication between terminal devices is a technical problem that urgently needs to be resolved.

SUMMARY

This application provides a communication method and apparatus, to reduce a communication delay.

According to a first aspect, a communication method is provided. The method includes: A first digital reflection DR receives a first message, where the first message includes data to be sent to a first terminal device and an identifier of the first terminal device, and the first DR is a DR associated with the first terminal device. The first DR transmits the data to the first terminal device based on a local locator LLOC of the first terminal device, where the first DR stores a twin-globally unique temporary identity TWIN-GUTI of the first terminal device, the TWIN-GUTI includes the LLOC, the LLOC corresponds to the identifier of the first terminal device, the first DR is deployed on first multi-access edge computing MEC, and the TWIN-GUTI is generated by the first MEC.

In the foregoing technical solution, after receiving the data that needs to be sent to the first terminal device, the first DR may directly send the data to the first terminal device based on the LLOC in the TWIN-GUTI of the first terminal device that is stored in the first DR, and does not need to query a mapping system for the address of the first terminal device, so that a communication delay can be reduced.

In an implementation, the method further includes: The first DR receives a second message sent by second multi-access edge computing MEC, where the second message includes an updated LLOC corresponding to the first terminal device, and the updated LLOC is generated by the second MEC for the first terminal device after the first terminal device hands over from the first MEC to the second MEC. The first DR transmits the data to the first terminal device based on the updated LLOC.

According to a second aspect, a communication method is provided. The method includes: A second digital reflection DR receives a third message sent by a second terminal device, where the third message includes an identifier of a first terminal device and data to be sent to the first terminal device, and the second DR is a DR associated with the second terminal device. The second DR obtains a routing locator RLOC of a first digital reflection DR associated with the first terminal device. The second DR sends a first message to the first DR based on the RLOC, where the first message includes the data and the identifier of the first terminal device. The first DR receives the first message sent by the second DR. The first DR transmits the data to the first terminal device based on a local locator LLOC of the first terminal device, where the first DR stores a twin-globally unique temporary identity TWIN-GUTI of the first terminal device, the TWIN-GUTI includes the LLOC, the LLOC corresponds to the identifier of the first terminal device, the first DR is deployed on first multi-access edge computing MEC, and the TWIN-GUTI is generated by the first MEC.

In the foregoing technical solution, based on an idea of location-identifier separation, when the second terminal device needs to send data to the first terminal device, the second terminal device sends the data to the second DR associated with the second terminal device. The second DR may obtain, by querying a DMS mapping system, the routing locator RLOC of the first DR associated with the first terminal device, and send the data to the first DR based on the RLOC, and then the first DR sends the data to the first terminal device based on the LLOC that is of the first terminal device and that is stored in the first DR. In this process, the first DR communicates with the first terminal device, and the first DR does not need to query the mapping system for the LLOC of the first terminal device, so that a communication delay can be reduced.

In an implementation, that the second DR obtains a routing locator RLOC of a first digital reflection DR associated with the first terminal device includes: The second DR sends a fourth message to a distributed mapping system DMS, where the fourth message is used to request to obtain the RLOC of the first DR, and the fourth message includes the identifier of the first terminal device. The DMS receives the fourth message sent by the second DR. The DMS sends a fourth response message to the second DR, where the fourth response message includes the RLOC of the first DR, the DMS stores a mapping relationship between the identifier of the first terminal device and the RLOC of the first DR, and the identifier of the first terminal device one-to-one corresponds to the RLOC. The second DR receives the fourth response message to obtain the RLOC.

In an implementation, the DMS stores a mapping relationship among the identifier of the first terminal device, an identifier of the first DR, and the RLOC of the first DR.

In an implementation, that the second DR obtains a routing locator RLOC of a first digital reflection DR associated with the first terminal device includes: The second DR queries locally stored cache data, to obtain the RLOC of the first DR.

In an implementation, the method further includes: The second DR sends a fifth subscription request message to the DMS, where the fifth subscription request message includes the identifier of the first terminal device, and the fifth subscription request message is used to subscribe to an updated RLOC of the first DR. The DMS receives the fifth subscription request message sent by the second DR. When the RLOC of the first DR changes, the DMS sends a fifth response message to the second DR, where the fifth response message includes the updated RLOC of the first DR. The second DR receives the fifth response message sent by the DMS, where the fifth response message includes the updated RLOC of the first DR.

According to a third aspect, multi-access edge computing (MEC) is provided. At least one digital reflection DR is deployed in the MEC. The MEC includes a memory and a processor. The memory is configured to store a computer program, and the processor is configured to execute the computer program stored in the memory. The at least one deployed digital reflection DR is a first DR, so that a function of the first DR in the method in the first aspect or any one of the possible implementations of the first aspect is performed, or the at least one deployed digital reflection DR is a second DR, so that a function of the second DR in the method in the second aspect or any one of the possible implementations of the second aspect is performed.

According to a fourth aspect, a communication apparatus is provided. The communication apparatus is used in a first digital reflection DR and includes: a transceiver unit, configured to receive a first message, where the first message includes data to be sent to a first terminal device and an identifier of the first terminal device, and the first DR is a DR associated with the first terminal device. The transceiver unit is further configured to transmit, based on a local locator LLOC of the first terminal device, the data to the first terminal device, where the first DR stores a twin-globally unique temporary identity TWIN-GUTI of the first terminal device, the TWIN-GUTI includes the LLOC, and the LLOC corresponds to the identifier of the first terminal device. The first DR is deployed on first multi-access edge computing MEC, and the TWIN-GUTI is generated by the first MEC.

In an implementation, the transceiver unit is further configured to: receive a second message sent by second multi-access edge computing MEC, where the second message includes an updated LLOC corresponding to the first terminal device, and the updated LLOC is generated by the second MEC for the first terminal device after the first terminal device hands over from the first MEC to the second MEC; and transmit the data to the first terminal device based on the updated LLOC.

According to a fifth aspect, a communication system is provided, including a first digital reflection DR, a second digital reflection DR, and a distributed mapping system DMS in the methods according to the first aspect and the second aspect.

According to a sixth aspect, a communication device is provided, including a processor and a transceiver. The transceiver is configured to receive computer code or instructions, and transmit the computer code or the instructions to the processor, and the processor runs the computer code or the instructions according to the method in the first aspect or any one of the possible implementations of the first aspect.

According to a seventh aspect, a computer-readable storage medium is provided. The computer-readable medium stores a computer program. When the computer program is run on a computer, the computer is enabled to perform the method in the first aspect or any one of the possible implementations of the first aspect.

According to an eighth aspect, a computer-readable storage medium is provided. The computer-readable medium stores a computer program. When the computer program is run on a computer, the computer is enabled to perform the method in the second aspect or any one of the possible implementations of the second aspect.

DESCRIPTION OF EMBODIMENTS

The following describes technical solutions of this application with reference to the drawings.

Embodiments of this application may be applied to various communication systems, for example, a wireless local area network system (WLAN), a narrowband internet of things system (NB-IoT), a global system for mobile communications (GSM), a system of enhanced data rate for GSM evolution (EDGE), a wideband code division multiple access system (WCDMA), a code division multiple access 2000 system (CDMA2000), a time division-synchronization code division multiple access system (TD-SCDMA), a long-term evolution system (LTE), satellite communication, a 5th generation (5G) system, a new communication system that emerges in the future, or the like.

A terminal device in embodiments of this application may include various handheld devices, vehicle-mounted devices, wearable devices, or computing devices that have a wireless communication function, or other processing devices connected to a wireless modem. The terminal may be a mobile station (MS), a subscriber unit, user equipment (UE), a cellular phone, a smart phone, a wireless data card, a personal digital assistant (PDA) computer, a tablet computer, a wireless modem, a handset, a laptop computer, a machine type communication (MTC) terminal, or the like.

All existing communication networks are network-centric, and users adapt to the networks, that is, the users can select only a function provided by the networks. Especially, a function provided by a centralized core network is of a large granularity, and cannot meet personalized requirements of the users. An existing centralized core network element entity can generally process a large quantity of users, and is deployed in a centralized manner. Therefore, the centralized core network element entity has a high position in a network, and has a risk of a single point failure, for example, network elements such as a mobility management network element, a session management network element, a user data management network element, and a policy management network element.

Figure 1:
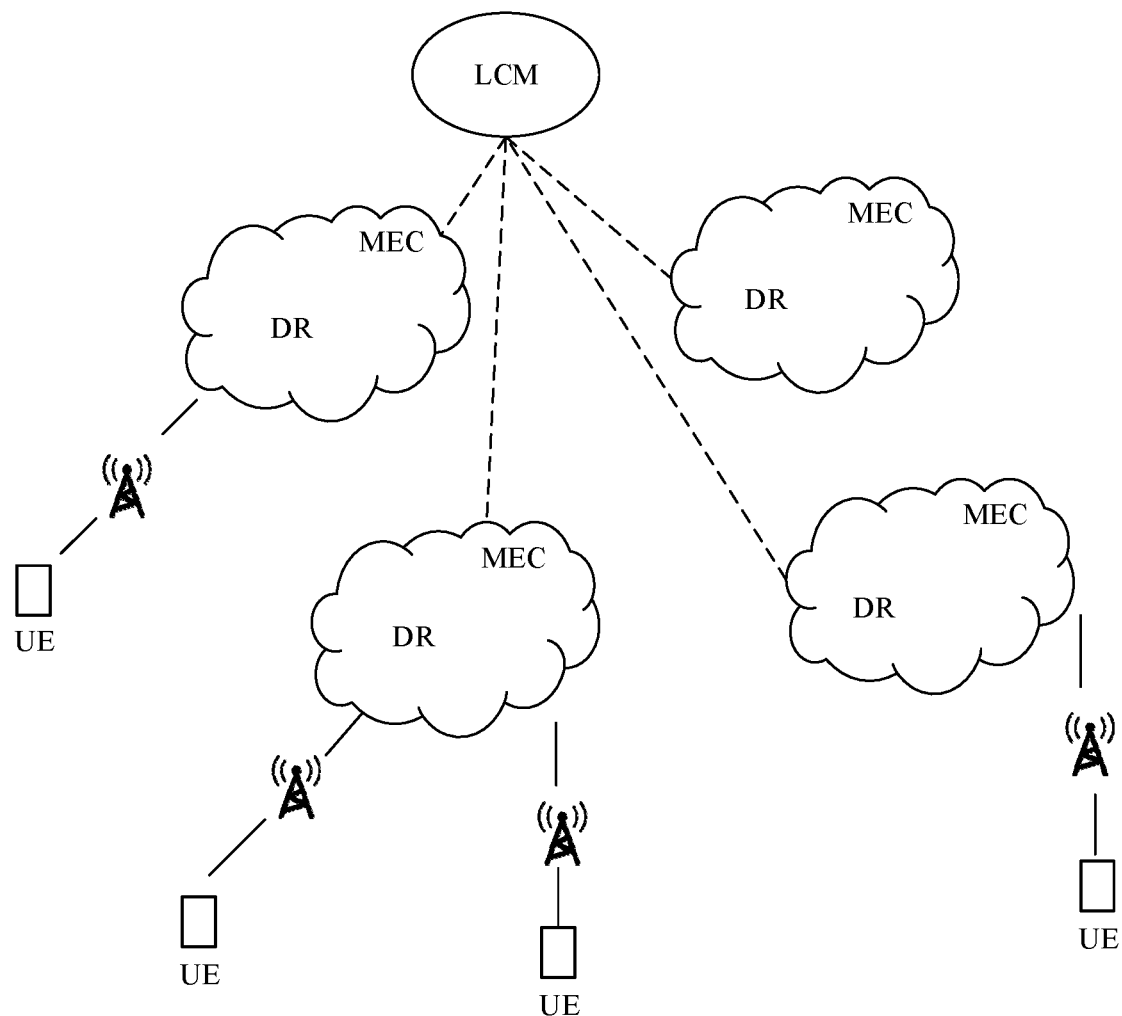
FIG. 1 is a schematic diagram of a UCN architecture.

To resolve the foregoing problem, a user centric network (UCN) architecture is provided. As shown in FIG. 1, a digital reflection (DR) is deployed on an edge cloud, and each UE has its own DR. The DR can be dynamically migrated to multi-access edge computing (MEC) where a user is located along with the user as required, to implement a user-centric network architecture design.

A distributed data provisioning system (DDPS) can manage personal digital property of the user, including an identity, an application name identity, and user status information. A distributed mapping system (DMS) establishes, based on technologies such as distributed hashing, a distributed mapping system among a user identity, an application name, and an address, and is deployed in the edge cloud in a distributed manner, to meet a near-real-time update and query requirement. A life cycle management system (LCM) is based on the distributed architecture and implements DR life cycle management and operations.

The UCN network architecture is a disruptive design for an existing network architecture. Therefore, many existing network functions, communication solutions, workflows, and the like need to be changed accordingly. Mobility communication is a key problem that needs to be resolved. In a conventional mobile network architecture, due to a semantic overload problem of the Internet Protocol (IP), a tunnel mechanism is used to resolve mobility communication, and there are many problems such as a non-optimal path caused by a fixed anchor point and a large packet header overhead. In the distributed UCN architecture, there is no centralized network element, especially a centralized fixed anchor point such as a user plane function (UPF)/public data network gateway (PGW), but each UE has its own virtual DR. The DR is migrated in the MEC with movement of the UE, which provides an opportunity for introducing technologies such as location-identifier separation to realize mobile communication.

Figure 2:
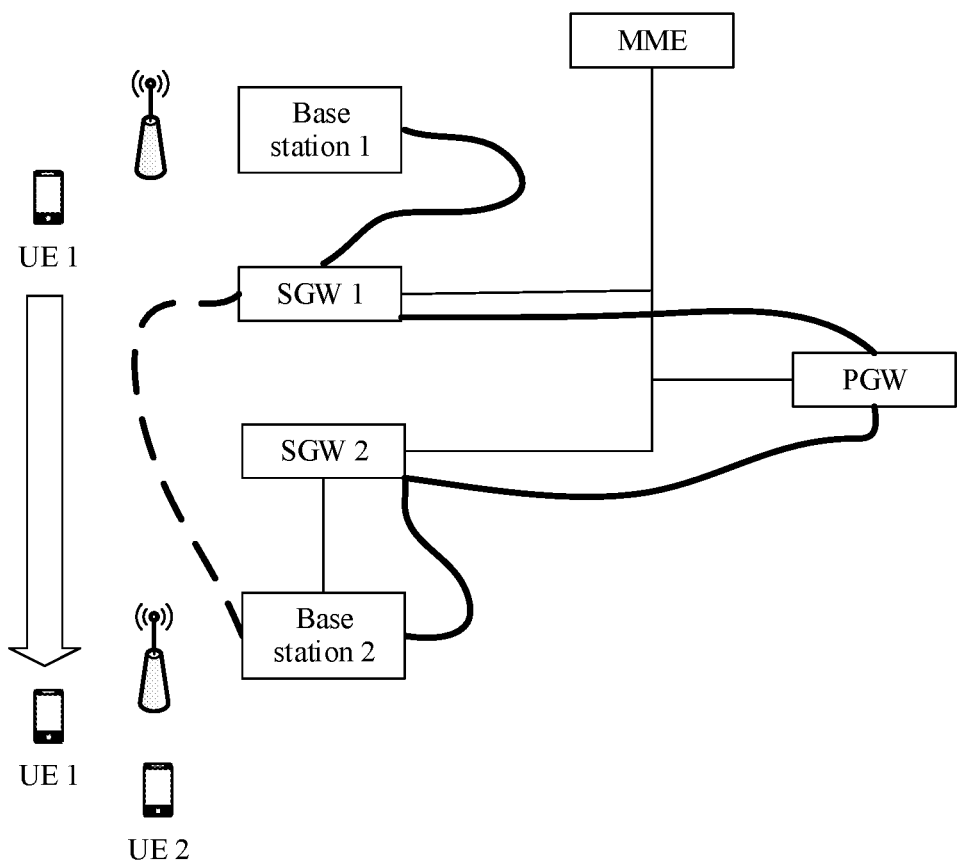
FIG. 2 is a schematic diagram of GTP-based mobility communication in LTE.

Currently, in LTE and 5G, a tunnel solution is used to resolve a mobility problem. A general packet radio service (GTP) technology includes a GTP control plane protocol and a GTP user plane protocol. Under the control of the GTP control plane protocol between a base station and a mobility management entity (MME), GTP tunnels are established between the base station and a core network such as a serving gateway (SGW) and a PGW network element, and user data is encapsulated in the tunnels for transmission. The GTP control plane protocol is responsible for establishing, deleting, and modifying these tunnels. FIG. 2 is a schematic diagram of GTP-based mobility communication in LTE. A UE 1 communicates with a UE 2. Before the UE 1 moves, the UE 1 communicates with the UE 2 through base station 1-SGW 1-PGW-SGW 2-base station 2. If the UE 1 moves as shown in FIG. 2, the UE 1 communicates with the UE 2 through base station 2-SGW 1-PGW-SGW 2-base station 2.

In this technical solution, due to dual semantics of the IP, the tunnel solution (such as the GTP) is used to resolve mobility communication, which leads to excessive packet header overheads. Secondly, centralized anchor aggregation is overloaded, becomes a bottleneck of system capacity, and has a risk of a single point failure and distributed denial of service (DDOS) attack. Finally, all traffic passes through an anchor point PGW, and there is a problem of bellmouth traffic.

A mobility first project is a plan for a future Internet architecture and adapts to a mobile requirement. Mobility first designs a brand-new globally unique temporary identity (GUID) of a user as identities of a mobile terminal, a network device, a network service, and the like. A network address is used as a location identifier, and identity-location mapping is realized through a global name system (GNS). Hybrid routing based on a name and an address uses a fast global name resolution service to dynamically bind a target GUID and its latest group of network addresses. Hop-by-hop (or segment-by-segment) transfer is used to transfer a file between routers. The entire file is received and stored at a current node before being sent to a next hop.

This solution is mainly used to meet mobility requirements. A globally unique identity is used to implement identity-location mapping, and an existing architecture, a terminal protocol, and the like need to be greatly modified. Therefore, deployability is poor. The network device and the memory/server reflect requirements of information transmission and information storage/service, respectively. Naturally, they are loosely coupled. Speeds of the two devices are different. An integrated cache-forwarding mode has great limitations in applications.

A dual semantic attribute of an IP address causes the problem of mobility communication. A location-identifier separation protocol (location-ID separation protocol, LISP) generally defines two namespaces. An endpoint identity (EID) is used to identify a mobile terminal, and a routing locator (RLOC) identifies an egress tunnel router (ETR)/an ingress tunnel router (ITR) accessed by the terminal. Names and addresses are mapped through a dynamic mapping system. When a packet passes through the ITR, the ITR queries the mapping system to obtain an EID/RLOC mapping pair, adds RLOC encapsulation to a packet header, and transmits the packet to the ETR. The ITR decapsulates the packet header, queries the mapping system again to obtain EID/LLOC mapping, addresses a UE through the LLOC, and forwards the packet. Mobility management is implemented through two-level mapping.

An advantage of separating an identity from a location in resolving mobility is obvious. When the terminal device moves, although a routing identifier representing a location of the terminal device changes, an access identifier of the terminal device remains unchanged. Therefore, a communication connection may not be interrupted.

The LISP is designed to resolve a route scalability problem. It does not support random access and handover of the mobile terminal. The ingress and egress tunnel routers need to maintain mapping information of all UEs in domain and register mapping entries with the mapping system. The ingress and egress tunnel routers is a centralized anchor, which may cause single point failures and DDOS attacks. This solution is not practical because UE registration authentication and policy enforcement need to be considered.

Figure 3:
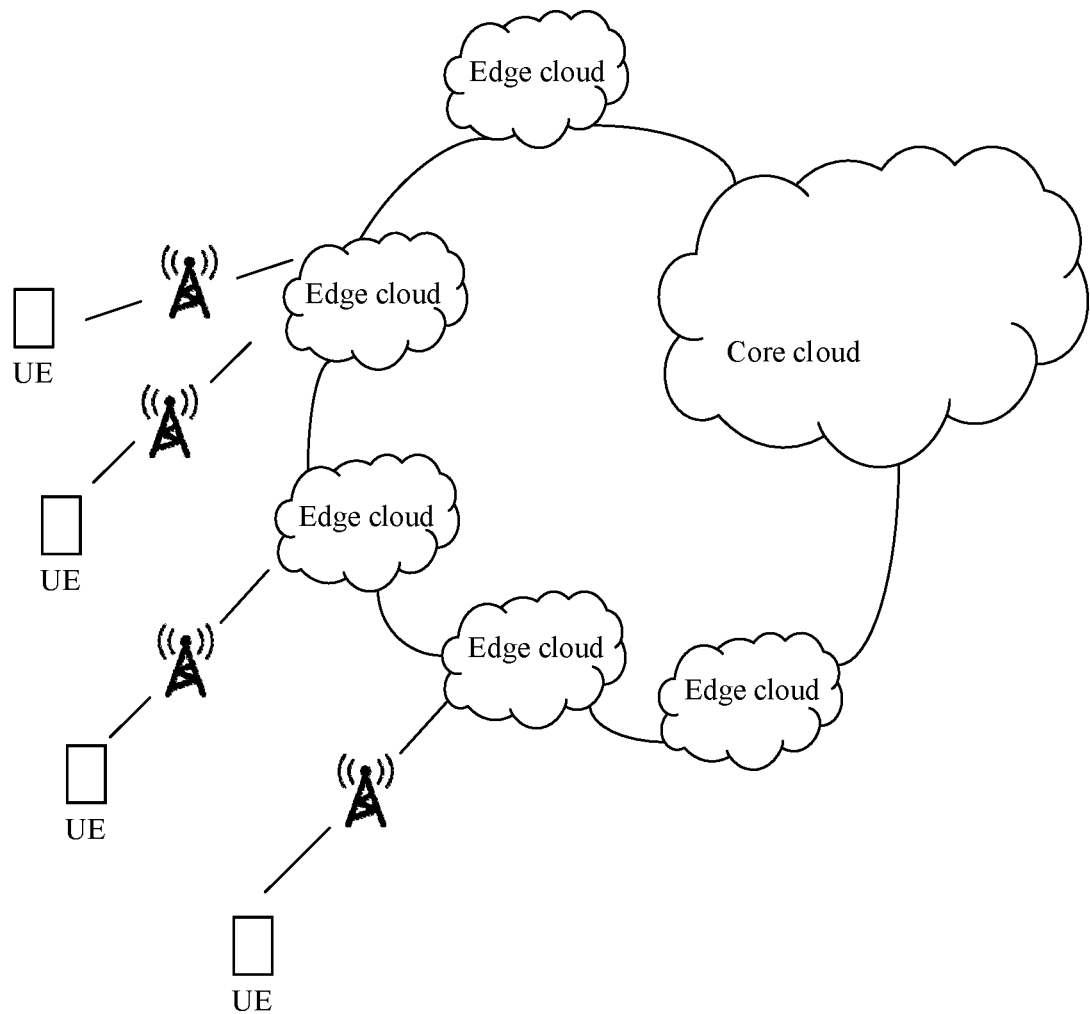
FIG. 3 is a schematic diagram of a network architecture in which an edge cloud is widely deployed according to an embodiment of this application.

In the future, network edge cloudification becomes an inevitable trend. An edge cloud and a core cloud collaborate and complement each other. The edge cloud is closer to users and can better support applications that have high requirements on delay and data privacy. Therefore, the edge cloud is suitable for distributed deployment of network functions. Embodiments of this application are based on an application scenario in which it is assumed that the edge cloud has been widely deployed. FIG. 3 is a schematic diagram of a network architecture in which an edge cloud is widely deployed according to an embodiment of this application.

In a movement process of a user, cross-base station handover and cross-MEC handover occur in a same MEC domain, and mobility communication of a UE needs to be considered.

To facilitate understanding of embodiments of this application, a twin-globally unique temporary identity (TWIN-GUTI) of the UE is briefly described.

Figure 4:
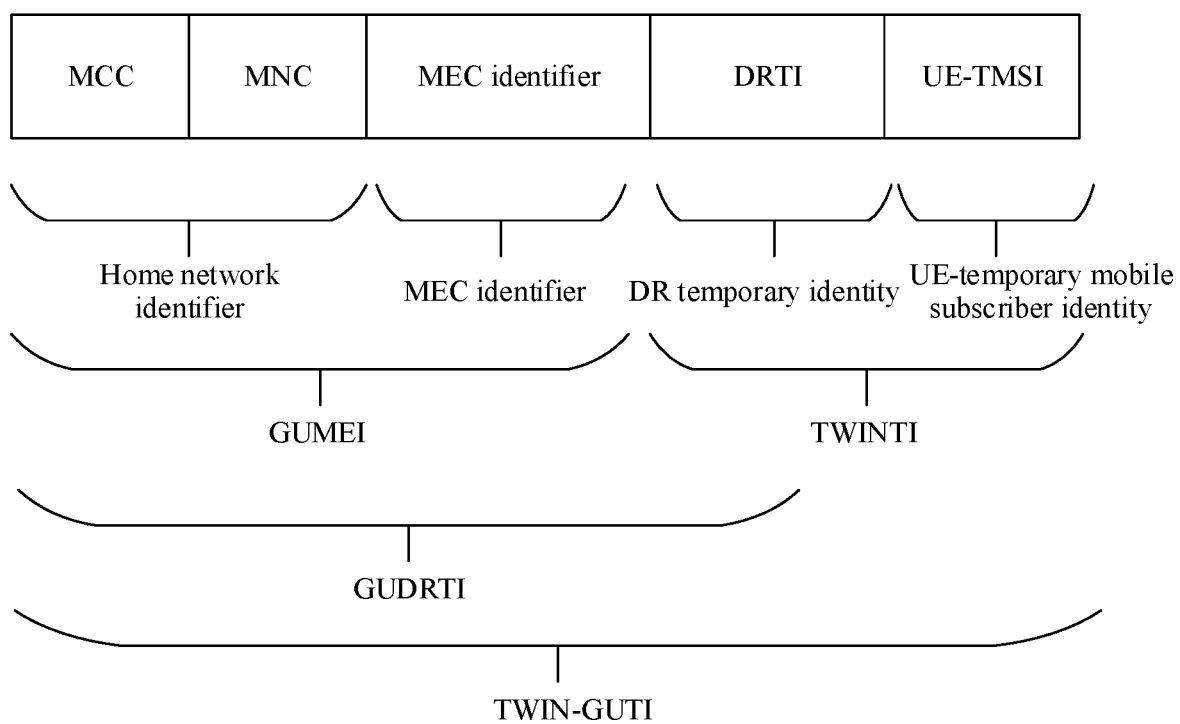
FIG. 4 is a schematic composition diagram of a TWIN-GUTI according to an embodiment of this application.

FIG. 4 is a schematic composition diagram of a TWIN-GUTI. The TWIN-GUTI includes a terminal device-temporary mobile subscriber identity (ue-temporary mobile subscriber identity, UE-TMSI), a DR temporary identity (DRTI), a mobile country code (MCC), a mobile network code (MNC), and an MEC identifier. A globally unique MEC identity (GUMEI) includes an MCC, an MNC, and an MEC identifier, and a globally unique DR temporary identity (GUDRTI) includes an MCC, an MNC, and a DRTI. The DRTI and the UE-TMSI form a twin temporary identity (TWINTI). The DRTI and the UE-TMSI are paired and in a one-to-one correspondence. Specifically, the TWIN-GUTI is generated and allocated by the MEC, and the GUMEI may be used to indicate an MEC that allocates the TWIN-GUTI. The DRTI is a unique identity of the DR within this MEC range, and the UE-TMSI is a unique identity of the UE within this MEC range.

The MCC and the MNC are home network identifiers. The MCC uniquely identifies a three-digit code of a country to which a mobile subscriber belongs. The MNC is a code of an operator network in a country and consists of two or three digits. The MNC identifies a mobile communication network to which a mobile subscriber belongs.

There is a one-to-one correspondence between a terminal device and a DR. Each terminal device stores a TWIN-GUTI of the terminal device, and each DR also stores a TWIN-GUTI of a terminal device associated with the DR.

Figure 5:
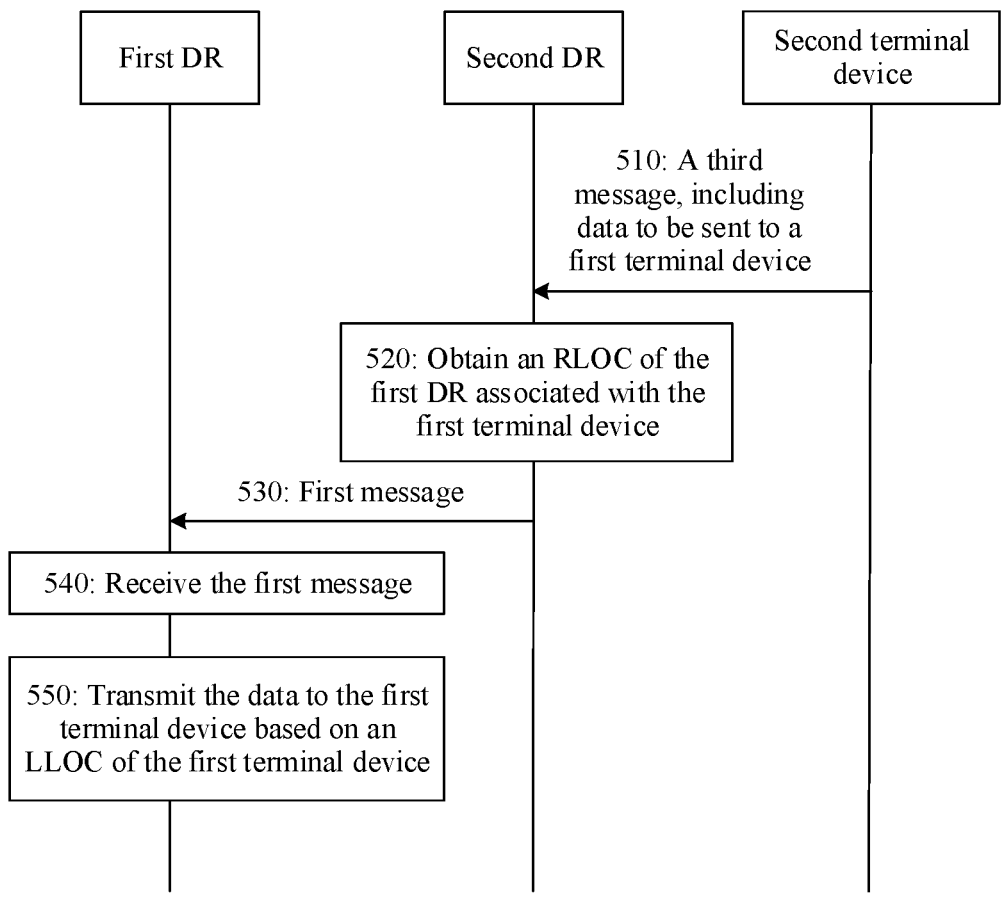
FIG. 5 is an interaction flowchart of a communication method according to an embodiment of this application.

An embodiment of this application proposes a communication method. FIG. 5 is an interaction flowchart of the communication method according to an embodiment of this application. In this embodiment, communication between UEs is implemented based on a binding relationship between a UE and a DR and with reference to an idea of location-identifier separation.

510: If a second terminal device needs to send data to a first terminal device, the second terminal device sends a third message to a second DR associated with the second terminal device, where the third message includes an identifier of the first terminal device and data to be sent by the second terminal device to the first terminal device, the third message is used to indicate the second DR to send the data to a first DR associated with the first terminal device, the second DR receives the third message sent by the second terminal device, and it should be understood that because the second terminal device stores a TWIN-GUTI of the second terminal device, and the TWIN-GUTI includes a temporary identity DRTI of the second DR associated with the second terminal device, the second terminal device may send the third message to the second DR based on the temporary identity DRTI of the second DR.

It should be understood that the first terminal device and the second terminal device may be terminal devices camping on different MEC, or may be terminal devices camping on the same MEC.

520: The second DR obtains, based on the identifier of the first terminal device in the received third message, a routing locator (RLOC) of the first DR associated with the first terminal device, where the RLOC is used to address the first DR.

Specifically, optionally, the second DR may send a fourth message to a distributed mapping system (DMS), where the fourth message is used to obtain the RLOC of the first DR, and the fourth message includes the identifier of the first terminal device. The distributed mapping system DMS stores a mapping relationship between an identifier of a terminal device and a DR, and a mapping relationship between an EID and an RLOC. A dynamic mapping system is used to map names and addresses to implement addressing between different DRs across MEC.

The DMS receives the fourth message sent by the second DR, and determines, based on the identifier of the first terminal device in the fourth message, the RLOC of the first DR associated with the first terminal device. The DMS stores a mapping relationship between the identifier of the first terminal device and the RLOC of the first DR, and the identifier of the first terminal device one-to-one corresponds to the RLOC of the first DR.

The DMS sends a fourth response message to the second DR, where the fourth response message includes the RLOC of the first DR. The second DR receives the fourth response message, and obtains the RLOC of the first DR from the fourth response message. It should be understood that the RLOC of the first DR is allocated to the first DR by first MEC on which the first DR camps, and may be used for addressing between DRs and addressing between the first terminal device and the first DR.

Specifically, optionally, the second DR may obtain the RLOC of the first DR from cached data by querying the locally stored cached data. If the second DR has previously sent the data to the first terminal device, and has queried the RLOC of the first DR, the cached data includes the RLOC of the first DR.

530: The second DR sends a first message to the first DR based on the RLOC of the first DR, where the first message includes the data sent by the second terminal device to the first terminal device and the identifier of the first terminal device, the first message is used to indicate the first DR to transmit or send the data to the first terminal device based on a local locator (LLOC) of the first terminal device, and the LLOC is allocated to the first terminal device by the first MEC on which the first terminal device camps, and is used by the first DR to address the first terminal device in a range of the first MEC.

Specifically, a source address of the first message is an RLOC of the second DR, and a destination address of the first message is the RLOC of the first DR.

540: The first DR receives the first message sent by the second DR, and determines the LLOC of the first terminal device based on the identifier of the first terminal device in the first message, where the first DR stores a TWIN-GUTI of the first terminal device, the TWIN-GUTI of the first terminal device includes the LLOC of the first terminal device, the LLOC corresponds to the identifier of the first terminal device, the first DR is deployed on the first MEC, and the TWIN-GUTI is generated by the first MEC.

Specifically, when generating the TWIN-GUTI for the first terminal device, the first MEC may respectively assign the RLOC of the first DR and the LLOC of the first terminal device to a DRTI and a UE-TMSI in the TWIN-GUTI. In other words, the RLOC of the first DR may correspond to the DRTI, and the LLOC of the first terminal device may correspond to the UE-TMSI.

Optionally, both the first DR and the first terminal device store the TWIN-GUTI. In this case, the first DR may address the first terminal device based on the LLOC in the TWIN-GUTI, and the first terminal device may address the first DR based on the RLOC in the TWIN-GUTI.

550: The first DR transmits, to the first terminal device, based on the LLOC that is of the first terminal device and that is in the stored TWIN-GUTI, the data that is sent by the second terminal device to the first terminal device, and the first terminal device receives the data sent by the first DR, to complete communication between the second terminal device and the first terminal device.

In the technical solution provided in this embodiment of this application, based on an idea of location-identifier separation, when the second terminal device needs to send data to the first terminal device, the second terminal device sends the data to the second DR associated with the second terminal device. The second DR may obtain, by querying a DMS mapping system, the routing locator RLOC of the first DR associated with the first terminal device, and send the data to the first DR based on the RLOC, and then the first DR sends the data to the first terminal device based on the LLOC that is of the first terminal device and that is stored in the first DR. In this process, the first DR communicates with the first terminal device, and the first DR does not need to query the mapping system for the LLOC of the first terminal device, so that a communication delay can be reduced.

In addition, compared with the distributed network architecture, there is no centralized network element in embodiments of this application, so that a single point failure and GTP packet header overheads can be avoided, and no signaling is required to maintain a GTP channel. Compared with the mobility first solution, in embodiments of this application, a globally unique temporary identity is used to implement an identity-location mapping solution, and this solution is more deployable.

It should be understood that if the first terminal device moves across base stations in the same MEC, the first DR associated with the first terminal device is not handed over, and a local locator LLOC of a UE does not change either, but routing information from the base stations to the DR changes.

If the first terminal device sends cross-MEC handover to hand over from first MEC to second MEC, the first DR is migrated to the second MEC, both the RLOC of the first DR and the LLOC of the first terminal device change, and the second MEC reallocates a routing locator RLOC to the first terminal device, reallocates a local locator LLOC to the first DR, and updates the TWIN-GUTI of the first terminal device. In addition, the DMS updates the mapping relationship between the identifier of the first terminal device and the RLOC of the first DR, a mapping relationship between an identifier of the first DR and MEC, and a correspondence between the original RLOC of the first DR and an updated RLOC of the first DR. It should be understood that the original RLOC is an RLOC allocated to the first DR by MEC on which the first DR camps last time.

Optionally, the first DR may receive a second message sent by the second MEC, where the second message includes an updated LLOC corresponding to the first terminal device. The updated LLOC is generated by the second MEC for the first terminal device after the first terminal device hands over from the first MEC to the second MEC, and the updated LLOC is a unique identifier of the first terminal device in a range of the second MEC.

Optionally, the second message may further include the updated RLOC corresponding to the first DR, and the updated RLOC is a unique identifier of the first DR in the range of the second MEC. If the first DR receives the data that is sent by the second DR and that needs to be transmitted to the first terminal device, the first DR may transmit the data to the first terminal device based on the updated LLOC.

Specifically, optionally, the second DR may further send a fifth subscription request message to the DMS, where the fifth subscription request message includes the identifier of the first terminal device, and the fifth subscription request message is used to subscribe to the updated RLOC of the first DR. The DMS receives the fifth subscription request message sent by the second DR. After the first terminal device hands over from the first MEC to the second MEC and the first DR is migrated to the second MEC, the second MEC generates a new RLOC for the first DR. In this case, the DMS updates the mapping relationship between the identifier of the first terminal device and the RLOC of the first DR, replaces the RLOC of the first DR with the updated RLOC of the first DR, replaces the identifier of the first terminal device with an updated identifier of the first terminal device, and retains the correspondence between the original RLOC of the first DR and the updated RLOC of the first DR. In this scenario, the original RLOC is a routing locator allocated to the first DR by the first MEC on which the first DR camps, and the new RLOC is a routing locator allocated to the first DR by the second MEC on which the first DR camps.

Optionally, if the RLOC of the first DR changes, the DMS may send a fifth response message to the second DR, where the fifth response message includes the updated RLOC of the first DR; and the second DR receives the fifth response message sent by the DMS. If the second DR needs to transmit a data packet to the first DR, the second DR sends the data packet to the first DR by using the updated RLOC of the first DR. In this case, the second DR replaces a destination address with the updated RLOC of the first DR.

It should be understood that the DMS updates, in real time, an RLOC of a DR associated with a terminal device, and the DR updates, in real time, an LLOC that is in a TWIN-GUTI of the terminal device associated with the DR and that is stored in the DR, so that a mobility communication problem of the terminal device can be resolved.

Figure 6:
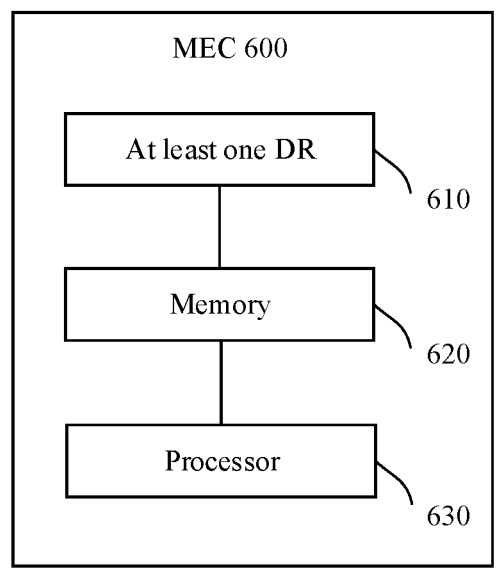
FIG. 6 is a schematic block diagram of MEC according to an embodiment of this application.

An embodiment of this application proposes multi-access edge computing MEC 600. FIG. 6 is a schematic block diagram of the MEC 600 according to an embodiment of this application.

At least one digital reflection DR 610 is deployed in the MEC. The MEC includes a memory 620 and a processor 630. The memory 620 is configured to store a computer program. The processor 630 is configured to execute the computer program stored in the memory 620. The at least one deployed digital reflection DR is a first DR, so that a function of the first DR in the method 500 provided in the embodiment of this application is performed, or the at least one deployed digital reflection DR is a second DR, so that a function of the second DR in the method 500 provided in the embodiment of this application is performed.

Figure 7:
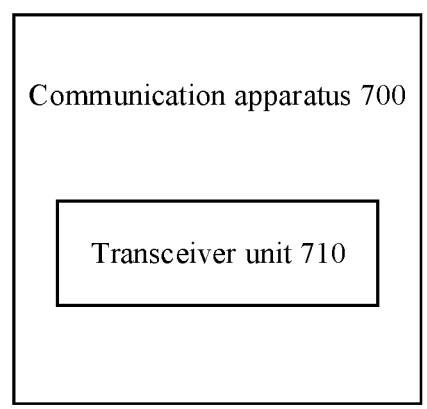
FIG. 7 is a schematic block diagram of a communication apparatus according to an embodiment of this application.

An embodiment of this application provides a communication apparatus 700. FIG. 7 is a schematic block diagram of the communication apparatus 700 according to an embodiment of this application. The communication apparatus may be a component that implements the method in the embodiment in FIG. 5, for example, a chip. The communication apparatus 700 includes a transceiver unit 710.

The transceiver unit 710 is configured to receive a first message, where the first message includes data to be sent to a first terminal device and an identifier of the first terminal device, and a first DR is a DR associated with the first terminal device.

The transceiver unit 710 is further configured to transmit the data to the first terminal device based on a local locator LLOC of the first terminal device, where the first DR stores a twin-globally unique temporary identity TWIN-GUTI of the first terminal device, the TWIN-GUTI includes the LLOC, the LLOC corresponds to the identifier of the first terminal device, the first DR is deployed on first multi-access edge computing MEC, and the TWIN-GUTI is generated by the first MEC.

Optionally, the transceiver unit 710 is further configured to: receive a second message sent by second multi-access edge computing MEC, where the second message includes an updated LLOC corresponding to the first terminal device, and the updated LLOC is generated by the second MEC for the first terminal device after the first terminal device hands over from the first MEC to the second MEC; and transmit the data to the first terminal device based on the updated LLOC.

Figure 8:
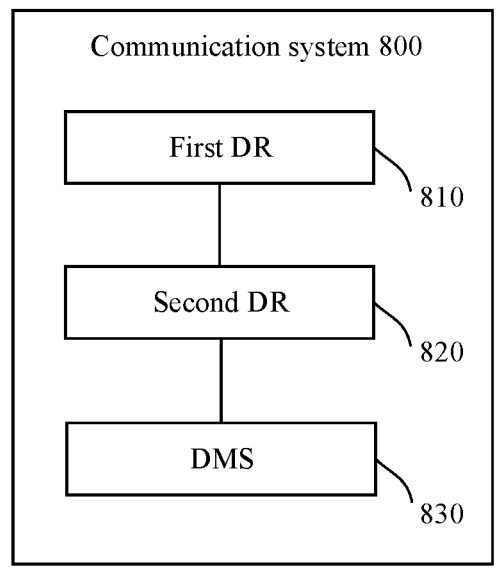
FIG. 8 is a schematic block diagram of a communication system according to an embodiment of this application.

An embodiment of this application provides a communication system 800. FIG. 8 is a schematic block diagram of the communication system 800 according to an embodiment of this application. The communication system 800 includes a first DR 810, a second DR 820, and a DMS 830 in the method 500 provided in the embodiment of this application.

Figure 9:
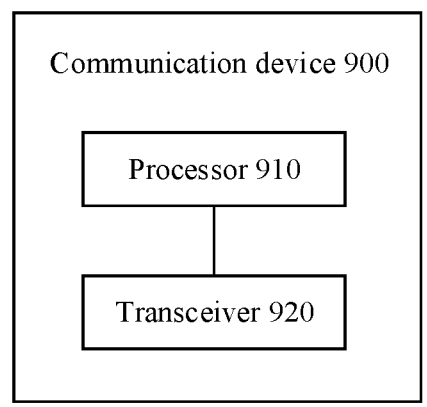
FIG. 9 is a schematic block diagram of a communication device according to an embodiment of this application.

An embodiment of this application provides a communication device 900. FIG. 9 is a schematic block diagram of the communication device 900 according to an embodiment of this application. The communication device 900 includes a processor 910 and a transceiver 920. The transceiver 920 is configured to receive computer code or instructions, and transmit the computer code or the instructions to the processor 910. The processor 910 runs the computer code or the instructions, to implement the methods in embodiments of this application. The communication device may be a communication device that implements the first DR function in the method embodiment in FIG. 5.

The foregoing processor may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The foregoing memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random-access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

An embodiment of this application further provides a computer-readable storage medium. The computer-readable storage medium stores a computer program used to implement the methods in the foregoing method embodiments. When the computer program is run on a computer, the computer is enabled to implement the methods in the foregoing method embodiments.

In addition, the term "and/or" in this application merely indicates an association relationship for describing associated objects, and indicates that three relationships may exist. For example, A and/or B may indicate the following three cases: Only A exists, both A and B exist, and only B exists. In addition, the character "/" in this specification generally indicates that the associated objects are in an "or" relationship. In this application, the term "at least one" may represent "one" and "two or more". For example, at least one of A, B, and C may represent the following seven cases: Only A exists, only B exists, only C exists, both A and B exist, both A and C exist, both C and B exist, and A, B, and C exist.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application, but such implementation should not be considered beyond the scope of this application.

A person skilled in the art may clearly learn that, for the purpose of convenient and brief description, for a specific working process of the foregoing system, apparatus, and units, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a second digital reflection (DR), a third message sent by a second terminal device, wherein the third message comprises an identifier of a first terminal device and data to be sent to the first terminal device, and the second DR is associated with the second terminal device;
   obtaining, by the second DR, a routing locator (RLOC) of a first DR associated with the first terminal device;
   sending, by the second DR, a first message to the first DR based on the RLOC, wherein the first message comprises the data and the identifier of the first terminal device.

2. The method according to claim 1, wherein the data is transmitted by the first DR to the first terminal device based on a local locator (LLOC) of the first terminal device, the first DR stores a twin-globally unique temporary identity (TWIN-GUTI) of the first terminal device, the TWIN-GUTI comprises the LLOC, the LLOC corresponds to the identifier of the first terminal device, the first DR is deployed on first multi-access edge computing (MEC), and the TWIN-GUTI is generated by the first MEC.

3. The method according to claim 1, wherein the obtaining, by the second DR, a RLOC of a first DR associated with the first terminal device comprises:
   sending, by the second DR, a fourth message to a distributed mapping system (DMS) to request to obtain the RLOC of the first DR, and the fourth message comprises the identifier of the first terminal device; and
   receiving, by the second DR, a fourth response message to obtain the RLOC.

4. The method according to claim 3, wherein the fourth response message is sent by the DMS to the second DR, the fourth response message comprises the RLOC of the first DR, the DMS stores a mapping relationship between the identifier of the first terminal device and the RLOC of the first DR, and the identifier of the first terminal device one-to-one corresponds to the RLOC.

5. The method according to claim 3, wherein
   the DMS stores a mapping relationship among the identifier of the first terminal device, an identifier of the first DR, and the RLOC of the first DR.

6. The method according to claim 1, wherein the obtaining, by the second DR, a RLOC of a first DR associated with the first terminal device comprises:
   querying, by the second DR, locally stored cache data to obtain the RLOC of the first DR.

7. The method according to claim 1, wherein the method further comprises:
   sending, by the second DR, a fifth subscription request message to a DMS to subscribe to an updated RLOC of the first DR, wherein the fifth subscription request message comprises the identifier of the first terminal device; and
   receiving, by the second DR, a fifth response message sent by the DMS, wherein the fifth response message comprises the updated RLOC of the first DR.

8. The method according to claim 7, wherein the fifth response message is sent by the DMS to the second DR in response to at least that the RLOC of the first DR changes.

9. An apparatus in a second digital reflection (DR), comprising:
   at least one processor; and
   at least one memory coupled to the at least one processor and storing programming instructions for execution by the at least one processor to cause the apparatus to:
   receive a third message sent by a second terminal device, wherein the third message comprises an identifier of a first terminal device and data to be sent to the first terminal device, and the second DR is associated with the second terminal device;
   obtain a routing locator (RLOC) of a first DR associated with the first terminal device;
   send a first message to the first DR based on the RLOC, wherein the first message comprises the data and the identifier of the first terminal device.

10. The apparatus according to claim 9, wherein the data is transmitted by the first DR to the first terminal device based on a local locator (LLOC) of the first terminal device, the first DR stores a twin-globally unique temporary identity (TWIN-GUTI) of the first terminal device, the TWIN-GUTI comprises the LLOC, the LLOC corresponds to the identifier of the first terminal device, the first DR is deployed on first multi-access edge computing (MEC), and the TWIN-GUTI is generated by the first MEC.

11. The apparatus according to claim 9, wherein the programming instructions for execution by the at least one processor comprise instructions to cause the apparatus to:

send a fourth message to a distributed mapping system (DMS) to request to obtain the RLOC of the first DR, and the fourth message comprises the identifier of the first terminal device; and receive a fourth response message to obtain the RLOC.

12. The apparatus according to claim 11, wherein the fourth response message is sent by the DMS to the second DR, the fourth response message comprises the RLOC of the first DR, the DMS stores a mapping relationship between the identifier of the first terminal device and the RLOC of the first DR, and the identifier of the first terminal device one-to-one corresponds to the RLOC.

13. The apparatus according to claim 11, wherein the DMS stores a mapping relationship among the identifier of the first terminal device, an identifier of the first DR, and the RLOC of the first DR.

14. The apparatus according to claim 9, wherein the programming instructions for execution by the at least one processor comprise instructions to cause the apparatus to:

query locally stored cache data to obtain the RLOC of the first DR.

15. The apparatus according to claim 9, wherein the programming instructions for execution by the at least one processor comprise instructions to cause the apparatus to:

send a fifth subscription request message to a DMS to subscribe to an updated RLOC of the first DR, wherein the fifth subscription request message comprises the identifier of the first terminal device; and receive a fifth response message sent by the DMS, wherein the fifth response message comprises the updated RLOC of the first DR.

16. The apparatus according to claim 15, wherein the fifth response message is sent by the DMS to the second DR in response to at least that the RLOC of the first DR changes.

17. A non-transitory, computer-readable medium storing one or more instructions executable by a computer system to perform operations comprising:

receiving, by a second digital reflection (DR), a third message sent by a second terminal device, wherein the third message comprises an identifier of a first terminal device and data to be sent to the first terminal device, and the second DR is associated with the second terminal device;

obtaining, by the second DR, a routing locator (RLOC) of a first DR associated with the first terminal device;

sending, by the second DR, a first message to the first DR based on the RLOC, wherein the first message comprises the data and the identifier of the first terminal device.

18. The non-transitory, computer-readable medium according to claim 17, wherein the data is transmitted by the first DR to the first terminal device based on a local locator (LLOC) of the first terminal device, the first DR stores a twin-globally unique temporary identity (TWIN-GUTI) of the first terminal device, the TWIN-GUTI comprises the LLOC, the LLOC corresponds to the identifier of the first terminal device, the first DR is deployed on first multi-access edge computing (MEC), and the TWIN-GUTI is generated by the first MEC.

19. The non-transitory, computer-readable medium according to claim 17, wherein the obtaining, by the second DR, a RLOC of a first DR associated with the first terminal device comprises:

sending, by the second DR, a fourth message to a distributed mapping system (DMS) to request to obtain the RLOC of the first DR, and the fourth message comprises the identifier of the first terminal device; and receiving, by the second DR, a fourth response message to obtain the RLOC.

20. The non-transitory, computer-readable medium according to claim 19, wherein the fourth response message is sent by the DMS to the second DR, the fourth response message comprises the RLOC of the first DR, the DMS stores a mapping relationship between the identifier of the first terminal device and the RLOC of the first DR, and the identifier of the first terminal device one-to-one corresponds to the RLOC.

\* \* \* \* \*